United States Patent [19]

Mouille

[11] 4,431,148

[45] Feb. 14, 1984

[54] SIMPLIFIED ANTI-RESONANT SUSPENSION DEVICE FOR A HELICOPTER

[75] Inventor: Rene L. Mouille, Ville "La Pinede"-Le Coton Rouge, France

[73] Assignee: Societe Nationale Industrielle Aerospatiale, Paris, France

[21] Appl. No.: 343,511

[22] Filed: Jan. 28, 1982

[30] Foreign Application Priority Data

Feb. 9, 1981 [FR] France .................. 81 02472

[51] Int. Cl.³ .............................. B64C 27/51
[52] U.S. Cl. .............................. 244/17.27; 244/17.25; 416/500
[58] Field of Search .................. 244/17.25, 17.27; 248/559, 636, 638; 188/379, 380; 416/500

[56] References Cited

U.S. PATENT DOCUMENTS 3,920,202  11/1975  Mouille ............................ 244/17.27
3,921,940  11/1975  Mouille ............................ 248/638

Primary Examiner—Trygve M. Blix
Assistant Examiner—Ivy M. Shum
Attorney, Agent, or Firm—Murray Schaffer

[57] ABSTRACT

The subject of the invention is a suspension device for a helicopter, intended for reducing the vibrations caused by its rotor. The main transmission box of the rotor is supported at the top by a set of oblique articulated bars and is bolted at its bottom to a diaphragm made of thin sheet metal, which can be deformed by bending, but not by shearing in its plane. Flexible arms arranged radially and supported by fixed mountings are articulated to the foot of the oblique bars and to the bottom of the transmission box; they each carry, at the end of a lever, a swinging weight acting by the effect of inertia.

18 Claims, 7 Drawing Figures

SIMPLIFIED ANTI-RESONANT SUSPENSION DEVICE FOR A HELICOPTER

BACKGROUND OF THE INVENTION

The invention relates to an anti-resonant suspension device for a helicopter consisting of a fuselage, a propulsion unit, a rotor and a transmission box located between said unit and said rotor and aligned with the axis of rotation of the latter, this device comprising a suspension plate which is located substantially in a plane perpendicular to the axis of the rotor and the central part of which is fastened to the bottom of the transmission box, and a set of at least three supporting parts, the upper ends of which are connected to the transmission box and the lower ends of which are articulated to the outer ends of arms arranged radially round the base of the transmission box to which they are connected, as well as being connected, in the region of their outer ends, to the fuselage at a strong point of the latter; the various connections of each radial arm allow it to experience deflections as a result of deformation in the radial plane (that is to say, passing through the axis of the rotor) which contains it, whilst these deflections impart substantial movements to a swinging weight mounted at the end of a rigid support, the other end of which is fastened to the end of the corresponding radial arm.

SUMMARY OF THE INVENTION

Starting from a known device of this type (U.S. patent application No. 229,749 of Jan. 29, 1981 now abandoned) intended for filter the vibrations between the main rotor and the fuselage of a helicopter in which the suspension plate and the radial arms merge into one and the same part which ensures, in addition to the suspension, that the reaction of the rotor drive torque is transferred to the fuselage, the subject of the present invention is a simplified device in which the suspension plate is independent of the radial arms and consists of a diaphragm made of thin sheet metal, which can be deformed by bending under forces exerted perpendicularly to its plane or under pivoting moments exerted about its center by the transmission box, but which is rigid as regards traction/compression and as regards shearing under forces and moments exerted in its plane, such as the rotor drive reaction torque, this diaphragm being integrated in the upper structure of the fuselage in the region of said suspension device.

In order to present great flexibility with respect to the vertical and tilting forces which it receives, the suspension diaphragm is preferably provided with circular ribs arranged concentrically round the bottom of the transmission box. It can also be made in the form of a multiple diaphragm consisting of several thin metal sheets superimposed above one another with a spacing and joined together in the manner of a concertina by their circular edges centered on the axis of the rotor.

Each radial arm can be connected to the transmission box by a joint having an axis perpendicular to the radial plane containing said arm, or else by a flexible connection arrangement giving it a certain freedom of movement both angularly and longitudinally.

In a first embodiment, each radial arm, made of metal or of a composite material based on high-strength fibres, is formed by a unit part which has, on the one hand, a flexible portion and, on the other hand, a thicker rigid portion, at points of which the arm is articulated to the supporting part and to the corresponding strong point of the fuselage and to which is fixed a rigid lever constituting the support for the corresponding swinging weight. In this case, the lever mentioned above is preferably directed towards the axis of the rotor and parallel to the radial arm to which it is fixed or at a slight angle to this.

In another embodiment which is preferred from a practical point of view, each radial arm is formed by a flexible radial strip and by one portion of a rigid lever, the other portion of which constitutes the support for the corresponding swinging weight, the outer end of said strip being fastened to said rigid lever in the region where the latter is articulated to a strong point of the fuselage. In this case, it is expedient to select each flexible strip and the swinging weight so that the alternating forces applied to the strong point of the fuselage are cancelled by the forces created at this same point by the inertia effect of the swinging weight. In this case, the rigid lever and the flexible strip advantageously extend in identical directions, the lever being formed by two rectilinear flat iron bars connected to one another and bordering the flexible strip laterally. Each of the swinging weights can then take the form of an upturned stirrup capping the two flat iron bars which form the rigid levers serving as supports for them.

In general, each radial arm can be articulated to the corresponding strong point of the fuselage by means of a joint with a double conical or cylindrical laminated bearing, and the end of each arm can be articulated to the corresponding supporting part by means of a combined joint with a double conical or cylindrical laminated bearing and with a ball-and-socket joint. All these joints can also make use of ball bearings, needle bearings or roller bearings.

It is expedient, on the other hand, to equip a device according to the invention with stops which limit the vertical movements of the supporting parts for the transmission box.

In order to improve the filtering of vibrations not damped by the device described, additional pendulum resonators can be provided. For this purpose, each swinging weight can be equipped with at least one resonator which consists of a flexible rod weighted with an inertia block and fixed to said swinging weight and which is tuned to a filtering frequency greater than the frequency for which the device is designed and preferably selected in the vicinity of double the product of the rotational speed of the rotor and the number of its blades.

A suspension device according to the invention offers great simplicity in its application to machines equipped with parts for supporting the main transmission box (whether they be oblique bars articulated to the top of the transmission box or mountings fixed to the periphery of this), and also presents a reduced mass in relation to known inertia devices. It is effective both in respect of pumping excitations due to vertical forces and in respect of excitations due to forces and moments generated in the plane of the rotor.

The following description, taken in conjunction with the drawings attached by way of non-limiting examples, will make it possible to understand fully how the present invention can be put into practice.

DETAILED DESCRIPTION OF THE INVENTION

Figure 1:
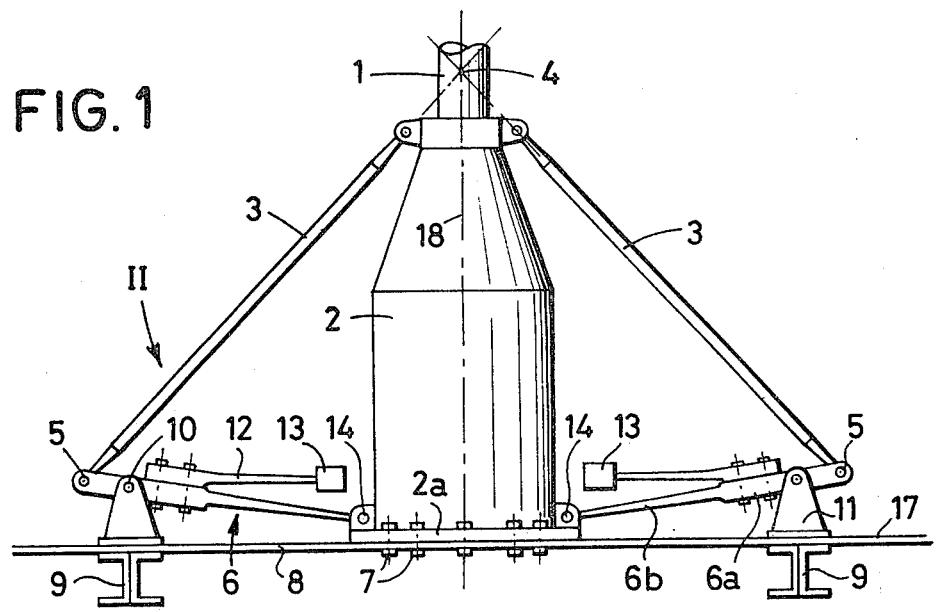
FIG. 1 shows schematically, in a side elevation, a suspension device according to the invention.

FIG. 1 shows the main transmission box 2 of a helicopter, located between a propulsion unit (not shown) and the shaft 1 of the rotor, the latter not being shown in more detail. The elements 1 and 2 are aligned with the axis of rotation 18 of the rotor and form a rigid unit.

The main transmission box 2 is supported by a set of oblique bars 3. These substantially converge at their upper ends at a point of convergence 4 located at the top of the transmission box 2 and on the axis 18 and are each connected at their lower ends, by means of a joint 5, to a flexible arm arranged radially in relation to the axis 18 and bearing via a joint 10 on a support 11 fixed to a strong frame 9 of the fuselage 17, whilst the lower end (that is to say, the end adjacent the axis 18) of this arm is articulated at 14 to a mounting fixed to the transmission box 2 in the vicinity of its bottom or base 2a. The axes of the joints 5, 10 and 14 are perpendicular to the radial plane containing the axis 18, each oblique bar 3 and the corresponding arm 6. The joint 10 is located between joints 5 and 14, in the vicinity of the joint 5. The joints 5 and 10 are retained in a thick and rigid portion 6a of the arm 6, of which only the remaining portion 6b nearest the axis 18 is flexible, its thickness lessening progressively in the direction of the axis 18.

The flexible arms 6 can be made of a metal (steel or titanium), of which the ratio of fatigue strength to bending modulus is high, or else of a laminated material, for example glass fibers coated with thermosetting resin.

Attached to the rigid portion 6a of each arm 6 is a rigid lever 12 which is directed towards the axis 18 and which carries at its end a swinging weight 13 generating inertial forces when it is set in motion. These weights 13 are intended to produce, at the points 10, forces which are identical, but contrary to the vertical alternating forces produced at these same points 10 by the oblique bars 3. Each lever 12 is located in the radial plane defined by the arm 6 and the bar 3 which correspond to it, and parallel to the arm 6 or with a slight angular offset of the order of 10°, intended to permit a free deflection of the swinging weight 13.

Furthermore, the bottom 2a of the transmission box 2 is bolted, by means of a ring of bolts 7, to the structure of the fuselage which consists, in this region, of a diaphragm 8, the plane of which is substantially perpendicular to the axis 18 and which can be deformed under the action of forces exerted in the direction of said axis and under the action of tilting forces causing pivoting about the point of intersection of the axis of rotation 18 with the plane of the diaphragm 8, but which is relatively rigid as regards traction/compression towards forces contained in its plane and as regards shearing under the action of the torque exerted likewise in its plane. This diaphragm is fixed to strong frames 9 of the fuselage by bolting or any other means.

In the suspension device described, the various vertical forces, that is to say those in the direction of the axis 18, which are exerted on the rotor are applied to the structure of the helicopter by means of oblique bars 3 which it subjects to traction/compression stresses.

The horizontal forces or moments, that is to say the forces or moments exerted in the plane of the rotor, give rise to horizontal bearing forces at the level of the point of convergence 4 of the oblique bars 3 and at the level of the bottom 2a of the transmission box 2. These are transmitted to the fuselage 17, on the one hand, by the bars 3 subjected to traction/compression stresses and, on the other hand, by the diaphram 8 stressed in its plane by the bottom of the transmission box. The reaction of the rotor drive torque is transmitted to the fuselage via the bottom of the transmission box 2 which subjects to shearing stress the diaphagm 8 to which it is fixed.

Consequently, the structural supports 11 receive only few dynamic vertical forces, the majority of these being suppressed by the weights 13 mounted on the arms 12. In fact, the flexible portion 6b of the arms amplifies, at the level of the swinging weights 13, the movements of the end of the bars 3, and the alternating movements of said weights create inertial forces which produce at 10 reactions opposed to the alternating forces applied by the bars 3.

Figure 2:
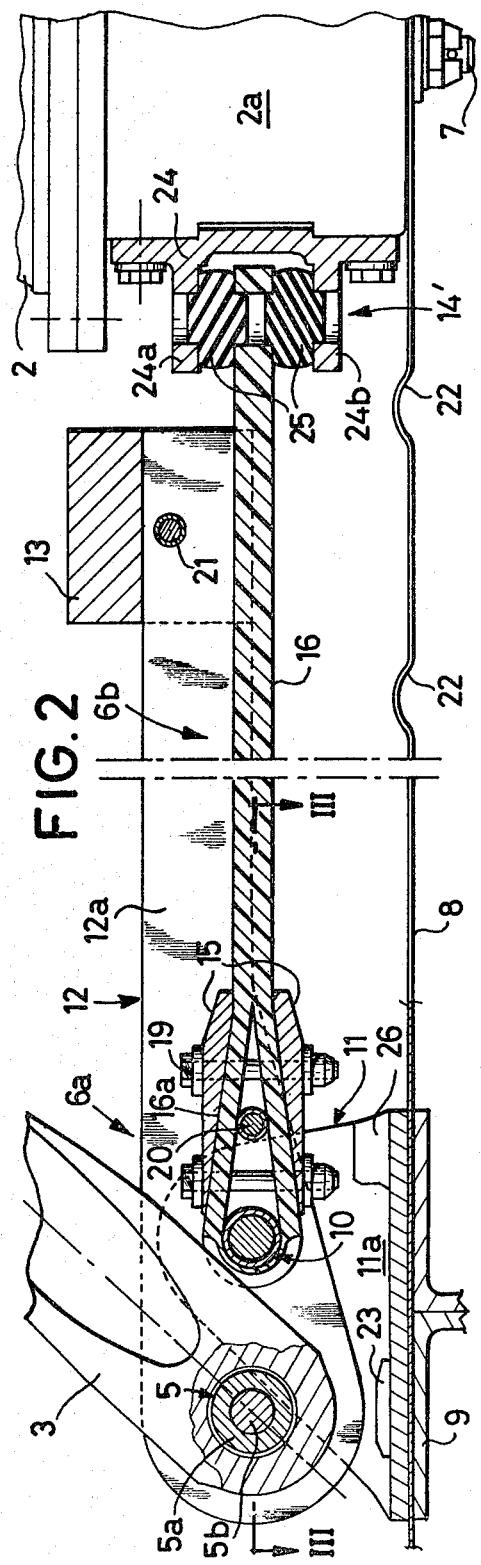
FIG. 2 shows a practical embodiment of a device according to the invention, in a view on a larger scale of the portion corresponding to the portion II of the subject of FIG. 1.
Figure 3:
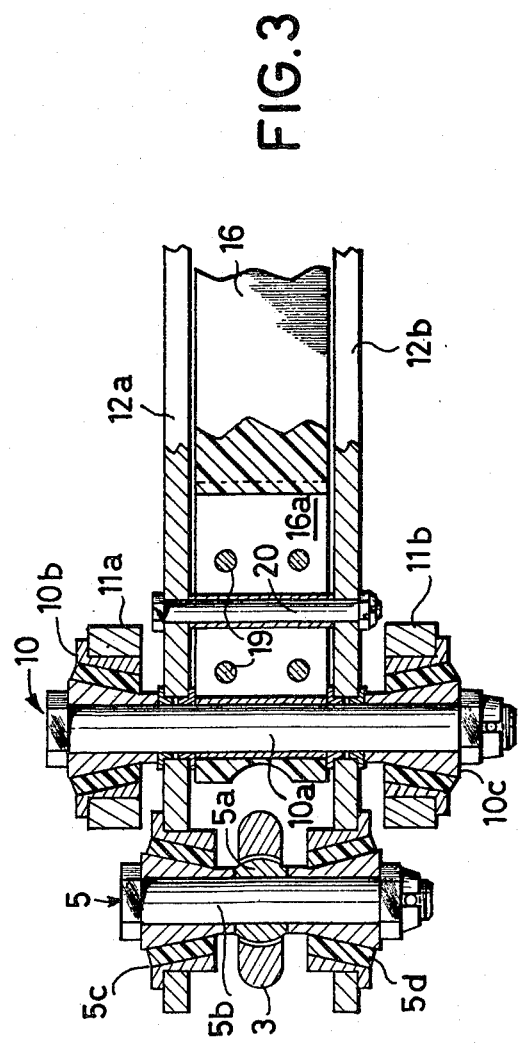
FIG. 3 shows a section along the line III—III of the subject of FIG. 2.

FIGS. 2 and 3 illustrate a practical embodiment of a suspension device according to the invention. In these Figures, the same reference numerals as in FIG. 1 have been used for equivalent elements. In this embodiment, the rigid portion 6a of the arms 6 is formed by a prolongation of the levers 12, whilst the flexible portion 6b consists of a flexible strip 16 fastened by its outer end to the lever 12 in the region of the joint 10. Each oblique bar 3, made by stamping, is therefore articulated here to the corresponding rigid lever 12 which consists of a pair of flat iron bars 12a, 12b. The corresponding joint 5 comprises a sphernical bearing 5a engaged with the end of the bar 3 and mounted on a rod 5b passing through the flat iron bars 12a, 12b, with conical laminated bearings 5c, 5d being interposed. The joint 10 of the corresponding lever 12 comprises a rod 10a passing through the flat iron bars 12a, 12b and carried, by means of conical laminated bearings 10b, 10c, by the wings 11a, 11b of the support 11. The laminated bearings 5c, d, 10b, c could also be cylindrical bearings. The two flat iron bars 12a, 12b are braced by the rods 5b and 10a and by the swinging weight 13 itself which consists of a piece in the form of an upturned U overlapping said flat iron bars and fixed by a bolt 21 passing through the unit as a whole.

Each flexible strip 16 has the appearance of a bar of rectangular cross-section which consists of a sheet of bands of glass threads coated with thermosetting resin, this sheet being folded back on itself round the joint rod 10a. The end loop 16a which the strip 16 forms in this way is reinforced by being gripped between two wedge-shaped blocks 15 retained by four bolts 19 and is connected rigidly to the two flat iron bars 12a, 12b of the lever 12 supporting the swinging weight 13 by means of the above-mentioned rod 10a and a bolt 20 also passing through said loop and bracing the two flat iron bars 12a, 12b.

At its inner end, each strip 16 is connected elastically, by means of a connection arrangement 14', to the base 2a of the transmission box 2 by being interposed between two elastomer studs 25 which are forcefitted and maintained in position between two wings 24a, 24b, possessed by a mounting 24 bolted to the base of the transmission box 2, by being fitted into circular holes provided at the end of the strip 16 and in each of the wings 24a, 24b.

As before, the base 2a of the transmission box is fixed to the diaphragm 8, formed by the skin of the fuselage, by means of a ring of bolts 7. This diaphragm is made of a thin sheet of steel or titanium with a thickness of the order of a millimeter. It is fixed by bolting to the rigid structural frames 9 of the fuselage. It possesses several stamped circular ribs 22 which are centered on the axis 18 and are intended to reduce the excess stresses which can be exerted on the diaphragm. When formed in this way, it also fulfils the function of a fire-guard. This diaphragm permits vertical alternating movements of the transmission box 2 and angular oscillations in relation to the vertical, to which the latter is likely to be subjected. It absorbs, without any substantial deformation, the reaction torque of the drive of the helicopter rotor so as to transmit it to the structure of the fuselage.

Each mounting 11 for connecting to the fuselage is provided with two stops 23 and 26 which prevent excessive static deformations of the radial arm 6. These stops are located under the rigid portion 6a of the arm 6 consisting of the end portion of the lever 12 supporting the swinging weight 13, on either side of the joint 10. The first stop 23 makes it possible to limit downwards the deflection of the bar 3 when the rotor does not support the weight of the machine. The second stop 26 serves as a bearing for the lever 12 and limits the upward deflections of the bar 3, for example for a limiting load factor of 2.5 corresponding to cases of sudden pull-out from a dive or very tight turning.

Figure 4:
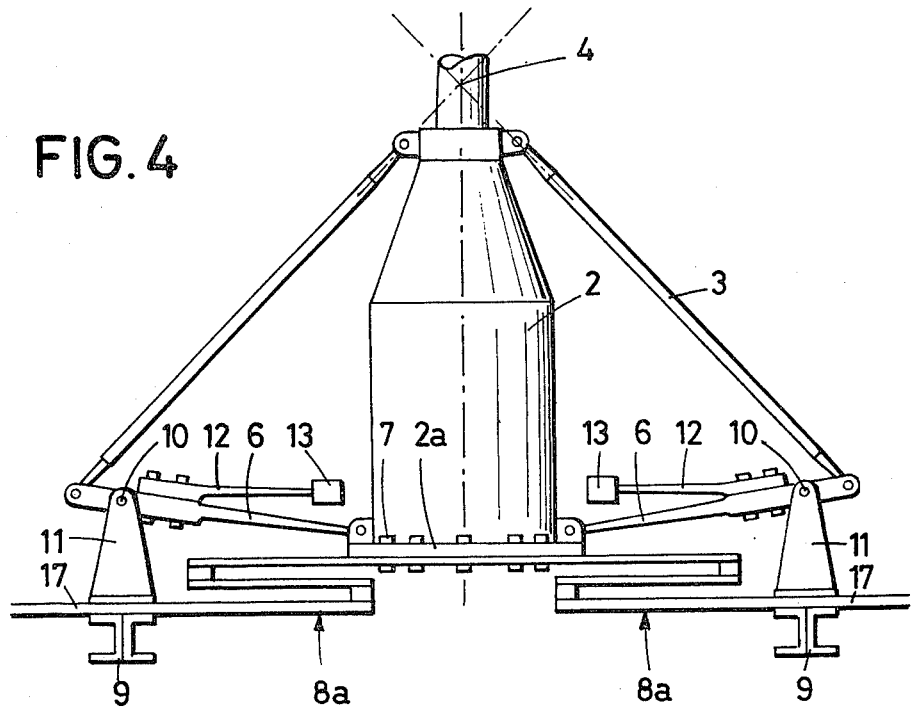
FIGS. 4 and 5 show, in the manner of FIG. 1, two alternative embodiments.

The flexible diaphragm described above can be replaced by a multiple disphragm formed by several thin and flexible metal sheets 8a which are superimposed above one another and connected in the manner of a concertina alternately by their outer and inner circular edges, as shown in FIG. 4.

Figure 5:
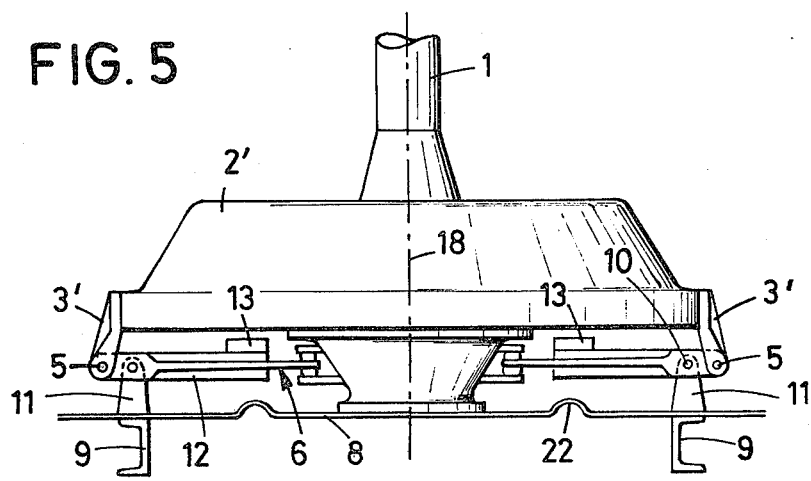

FIG. 5 illustrates an alternative form involving the use of a transmission box 2' of a different type, having a wide and flat shape instead of extending vertically like the transmission box 2. Here, the supporting parts are no longer oblique bars 3, but short mountings 3' likewise articulated at 5 to the arms 6 at their lower ends, whilst their upper ends are connected rigidly to the periphery of the box 2'. The suspension device otherwise remains unchanged. In the present example, the levers 12 are at a zero angle to the radial arms 6 which are holed for this purpose.

Figure 6:
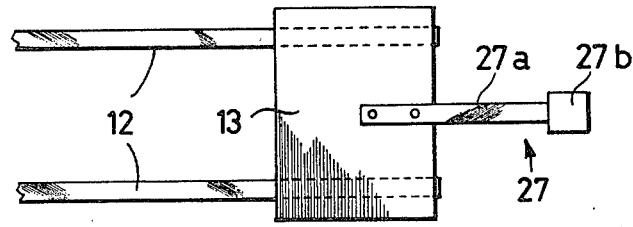
FIGS. 6 and 7 show, in plan views, additional resonators in a first and in a second embodiment respectively.
Figure 7:
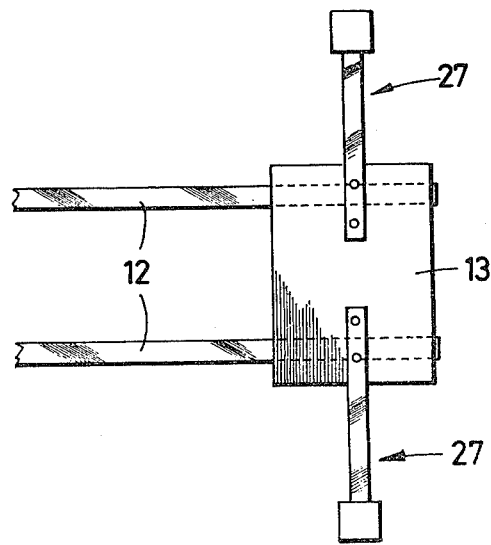

FIGS. 6 and 7 illustrate two additional arrangements intended for improving the filtering and absorption of vibrations. The arrangements described above only ensure filtering of longitudinal, lateral and vertical excitations centered on a frequency $b\Omega$ (b being the number of blades on the main rotor and $\Omega$ its rotational speed).

To improve the filtering of excitations generated at a frequency of $2b\Omega$, each swinging weight 13 of the present device is equipped with at least one resonator 27 tuned to the frequency $2b\Omega$ and consisting of a flexible rod 27a fixed to the swinging weight 13 and provided at its end with an inertia block 27b.

In FIG. 6, each swinging weight 13 is equipped with a resonator 27, the rod 27a of which prolongs towards the axis 18 of the rotor the lever 12 (which must be shortened to move the weight 13 away from the transmission box 2 so as to provide the space necessary for said resonator).

In FIG. 7, two resonators 27 are mounted on each swinging weight 13, their rods 27a being arranged perpendicularly to the radial plane containing the lever 12, and on either side of the swinging weight 13.

These improving arrangements are no heavier because swinging weights 13, the weight of which has been reduced by the amount of the weight of the additional resonator or resonators 27, are used here.

I claim:

1. Anti-resonant suspension device for a helicopter consisting of a fuselage, a propulsion unit, a rotor and a transmission box located between said unit and said rotor and aligned with the axis of rotation of the latter, this device comprising a suspension plate which is located substantially in a plane perpendicular to the axis of the rotor and the central portion of which is fastened to the bottom of the transmission box, and a set of at least three supporting parts, the upper ends of which are connected to the transmission box and the lower ends of which are articulated to the outer ends of arms arranged radially round the base of the transmission box to which they are connected, as well as being connected, in the region of their outer ends, to the fuselage at a strong point of the latter, the various connections of each radial arm allowing it to experience deflections as a result of deformation in the radial plane containing it, whilst these deflections impart substantial movements to a weight mounted at the end of a rigid support, the other end of which is fastened to the corresponding radial arm, whilst the suspension plate is independent of said radial arms and consists of a diaphragm made of thin sheet metal which can be deformed by bending under forces exerted perpendicularly to its plane and/or under pivoting moments exerted about its center by the transmission box, but which is rigid as regards traction/compression and as regards shearing under forces and moments exerted in its plane, such as the rotor drive reaction torque, this diaphragm being integrated in the upper structure of the fuselage.

2. Device according to claim 1, wherein said diaphragm possesses circular ribs arranged concentrically round the bottom of the transmission box.

3. Device according to claim 1, wherein each radial arm is connected to the transmission box by a joint having an axis perpendicular to the radial plane containing said arm.

4. Device according to claim 1, wherein each radial arm is connected to the transmission box by a flexible connection arrangement which gives it a certain freedom of movement both angularly and longitudinally.

5. Device according to claim 1, wherein each radial arm is articulated to the corresponding strong point of the fuselage by means of a joint with a double conical laminated bearing.

6. Device according to claim 1, wherein the end of each radial arm is articulated to the corresponding oblique bar by means of a joint with a double conical laminated bearing and with a ball-and-socket joint.

7. Device according to claim 1, wherein the joints of each radial arm are joints with bearings selected from the groups consisting of ball bearings, needle bearings and roller bearings.

8. Device according to claim 1, wherein each swinging weight is equipped with at least one secondary resonator which consists of a flexible rod weighted with an inertia block and fixed to said swinging weight and which is tuned to a filtering frequency greater than the frequency for which the device is designed, and which can be selected in the vicinity of double the product of the rotational speed of the rotor and the number of its blades.

9. Anti-resonant suspension device for a helicopter having a fuselage, a propulsion unit, a rotor and a transmission box located between said unit and said rotor and aligned with the axis of rotation of the latter, said suspension comprising a suspension plate located substantially fastened at its central portion to the bottom of said transmission box in a plane perpendicular to the axis of the rotor, and at least three sets of oblique supporting bars and radial arms arranged about said transmission box, each of said bars being articulately connected at its upper end to the transmission box and its lower end to the outer ends of the associated arm, said associated arm being articulately connected to the base of the transmission box at one end and to the fuselage near its outer end, the connections of each radial arm allowing it to experience deflections as a result of deformation in the radial plane, a rigid lever fixed at one end to each of said arms adjacent the connection of said arm to said fuselage and extending cantilevered inwardly toward said transmission box, a swinging weight disposed on the free end of said lever, said suspension plate being independent of said radial arms and comprising a diaphragm made of several thin metal sheets which can be deformed by bending under forces exerted perpendicularly to or under pivoting moments exerted about its center by the transmission box, but which is rigid as regards traction/compression and as regards shearing under forcer and moments exerted in its plane, said metal sheets having circular ribs arranged concentrically round the axis of the transmission box, superimposed above one another with spacing therebetween and joined together in the manner of a concertina by their circular ribs centered on the axis of the rotor.

10. Anti-resonant suspension device for a helicopter having a fuselage, a propulsion unit, a rotor and a transmission box located between said unit and said rotor and aligned with the axis of rotation of the latter, said suspension comprising a suspension plate located substantially fastened at its central portion to the bottom of said transmission box in a plane perpendicular to the axis of the rotor, and at least three sets of oblique supporting bars and radial arms arranged about said transmission box, each of said bars being articulately connected at its upper end to the transmission box and its lower end to the outer ends of the associated arm, said associated arm being articulately connected to the base of the transmission box at one end and to the fuselage near its outer end, the connections of each radial arm allowing it to experience deflections as a result of deformation in the radial plane, a rigid lever fixed at one end to each of said arms adjacent the connection of said arm to said fuselage and extending cantilevered inwardly toward said transmission box, a swinging weight disposed on the free end of said lever, said suspension plate being independent of said radial arms and comprising a diaphragm made of several thin metal sheets which can be deformed by bending under forces exerted perpendicularly to or under pivoting moments exerted about its center by the transmission box, but which is rigid as regards traction/compression and as regards shearing under forcer and moments exerted in its plane, said metal sheets having circular ribs arranged concentrically round the axis of the transmission box, superimposed above one another with spacing therebetween and joined together in the manner of a concertina by their circular ribs centered on the axis of the rotor and each radial arm being connected to the transmission box by a joint having an axis perpendicular to the plane containing said arm, each radial arm being unitarily formed having, on the one hand, a flexible portion and, on the other hand, a rigid portion, at points of which the arm is articulated to the oblique bar and to the corresponding point of the fuselage and to which is fixed a rigid lever constituting the support for the corresponding swinging weight.

11. Device according to claim 10, wherein each radial arm is formed by a flexible radial strip and by one portion of a rigid lever, the other portion of which constitutes the support for the corresponding swinging weight, the outer end of said strip being fastened to said rigid lever in the region where the latter is articulated to a point of the fuselage, and said lever being directed towards the axis of the rotor and at a slight or zero angle to the radial arm to which it is fixed.

12. Device according to claim 11, wherein each flexible radial strip and the swinging weight are selected so that the alternating forces applied to the strong point are cancelled by the forces created at this same point by the inertia effect of the swinging weight.

13. Device according to claim 12, wherein the rigid lever and the flexible strip extend in identical directions, the lever being formed by two rectilinear flat iron bars connected to one another and bordering the flexible strip laterally.

14. Device according to claim 13, wherein each swinging weight takes the form of an upturned stirrup capping the two flat iron bars which form said rigid lever.

15. Suspension system for the transmission box of a helicopter which includes a plate affixed on the bottom of the box in a plane perpendicular to the rotor axis, the box being connected to the helicopter frame by a minimum of three support pieces, each fixed on the box at its upper end, the lower end being connected to the outside end of a radial arm, itself connected to the collar of the box; each radial arm is connected to a strong point of the frame near this outside end, and a swivelling mass is mounted at one end of a support, the other end of which is connected with this radial arm; in this system, the plate is a membrane forming part of the helicopter structure, having features which make it subject to deformations by flexing through forces applied perpendicularly to its plane and/or pivoting movements imparted to its center by the transmission box, but maintaining the membrane rigidity against traction/compression and shearing caused by stress and forces acting within its plane, such as the reaction couple of the rotor drive.

16. System according to claim 15 wherein the membrane includes at least one concentric circular rib around the bottom of the transmission box.

17. System according to claim 15 wherein the membrane consists in an assembly of several thin plates, stacked, spaced and connected in the manner of a concertina by their circular rims, and centered on the rotor axis.

18. System according to claim 15 wherein each radial arm is articulated on the transmission box around an axis perpendicular to the radial plane by the arm, the articulations of each radial arm being such as to allow a certain freedom of angular and longitudinal movement.

* * * * *